US012452034B2

(12) United States Patent
Natu et al.

(10) Patent No.: US 12,452,034 B2
(45) Date of Patent: *Oct. 21, 2025

(54) EXPOSING CRYPTOGRAPHIC MEASUREMENTS OF PERIPHERAL COMPONENT INTERCONNECT EXPRESS (PCIE) DEVICE CONTROLLER FIRMWARE

(71) Applicant: Intel Corporation, Santa Clara, CA (US)

(72) Inventors: Mahesh Natu, Folsom, CA (US); Adrian Pearson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 17/973,990

(22) Filed: Oct. 26, 2022

(65) Prior Publication Data

US 2023/0123174 A1 Apr. 20, 2023

Related U.S. Application Data

(63) Continuation of application No. 15/836,225, filed on Dec. 8, 2017, now Pat. No. 11,522,679.

(Continued)

(51) Int. Cl.
*H04L 9/06* (2006.01)
*G06F 8/70* (2018.01)
(Continued)

(52) U.S. Cl.
CPC .............. *H04L 9/0643* (2013.01); *G06F 8/70* (2013.01); *G06F 13/4045* (2013.01);
(Continued)

(58) Field of Classification Search
CPC .................. H04L 9/0643; H04L 9/3239; H04L 2209/127; G06F 8/70; G06F 13/4045;
(Continued)

(56) References Cited

U.S. PATENT DOCUMENTS 8,756,420 B2 * 6/2014 Chang ................. G06F 21/6209
713/165
8,799,693 B2 8/2014 Vick et al.
(Continued)

OTHER PUBLICATIONS

"NIST Policy on Hash Functions", Computer Security Resource CenterUpdated Jan. 31 2018, http: csrc.nist.gov projects hash-functions nist-policy-on-hash-functions Accessed on Mar. 13 2018, (Aug. 5, 2015), 4 pgs.

(Continued)

*Primary Examiner* — Hosuk Song
(74) *Attorney, Agent, or Firm* — Schwegman Lundberg & Woessner, P.A.

(57) ABSTRACT

Examples disclosed herein include are computing device hardware components, computing devices, systems, machine-readable mediums, and interconnect protocols that provide for code object measurement of a peripheral device and a method for accessing the measurements to verify integrity across a computing interconnect (e.g., Peripheral Component Interconnect Express—PCIe). For example, a cryptographic processor of a PCIe endpoint (such as a peripheral) may take a measurement (e.g., computing a hash value) of a code object on the device prior to executing the code object. This measurement may be placed in a register that is accessible to another component, such as a host operating system across a PCIe bus for interrogation. The host operating system may utilize an interconnect protocol, such as a PCIe protocol to access the measurement. These measurements may be consumed by a Trusted Platform Manager or other components of a host system that may verify the measurements.

17 Claims, 9 Drawing Sheets

Related U.S. Application Data

(60) Provisional application No. 62/568,687, filed on Oct. 5, 2017.

(51) Int. Cl.
  *G06F 13/40* (2006.01)
  *G06F 21/57* (2013.01)
  *G06F 21/62* (2013.01)
  *H04L 9/32* (2006.01)

(52) U.S. Cl.
  CPC ............ *G06F 21/57* (2013.01); *G06F 21/572* (2013.01); *G06F 21/6209* (2013.01); *H04L 9/3239* (2013.01); *G06F 2213/0024* (2013.01); *H04L 2209/127* (2013.01)

(58) Field of Classification Search
  CPC .... G06F 21/57; G06F 21/572; G06F 21/6209; G06F 2213/0024
  See application file for complete search history.

(56) References Cited

U.S. PATENT DOCUMENTS

| | | | |
|---|---|---|---|
| 9,531,671 B2* | 12/2016 | Ellis | ............... A01N 25/30 |
| 9,928,377 B2 | 3/2018 | Narayanaswamy et al. | |
| 10,812,531 B2 | 10/2020 | Narayanaswamy et al. | |
| 11,522,679 B2 | 12/2022 | Natu et al. | |
| 11,575,672 B2* | 2/2023 | Yitbarek | ........... H04W 12/0471 |
| 2012/0331448 A1 | 12/2012 | Tanaka et al. | |
| 2013/0263262 A1 | 10/2013 | Forristal | |
| 2019/0044702 A1 | 2/2019 | Natu et al. | |
| 2019/0052617 A1* | 2/2019 | Chen | ................... H04L 63/0823 |
| 2019/0213706 A1 | 7/2019 | Goldman et al. | |
| 2020/0125772 A1* | 4/2020 | Volos | .................... G06F 21/602 |

OTHER PUBLICATIONS

"TCG Algorithm Registry", TCG, (Feb. 9, 2015), 28 pgs.
"RIPS PUB 180-4 Federal Informational Processing Standards Publication", Secure Hash Standard Information Technology Laboratory, (Aug. 2015), 36 pgs.
"PCI-SIG", Accessed on [Mar. 14, 2018] http: pcisig.com , (2018), 2 pgs.
"TCG PC Client Platform Firmware Profile Specification", Family 2.0Level 00 Revision 00.21, (Mar. 30, 2016), 103 pgs.
"U.S. Appl. No. 15/836,225, Non Final Office Action mailed Oct. 25, 2021", 9 pgs.
"U.S. Appl. No. 15/836,225, Response filed Jan. 25, 2022 to Non Final Office Action mailed Oct. 25, 2021", 9 pgs.
"U.S. Appl. No. 15/836,225, Final Office Action mailed May 9, 2022", 7 pgs.
"U.S. Appl. No. 15/836,225, Response filed Jul. 6, 2022 to Final Office Action mailed May 9, 2022", 8 pgs.
"U.S. Appl. No. 15/836,225, Notice of Allowance mailed Aug. 3, 2022", 6 pgs.
Savino, Ryan, "Open CIT 3.2.1 Product Guide", Wiki GiftHub, Accessed on Mar. 15, 2018 https: github.com opencit opencit wiki Open-CIT-3.2.1-Product-Guide, 184 pgs.

* cited by examiner

EXPOSING CRYPTOGRAPHIC MEASUREMENTS OF PERIPHERAL COMPONENT INTERCONNECT EXPRESS (PCIE) DEVICE CONTROLLER FIRMWARE

PRIORITY CLAIM

This patent application is a continuation of U.S. application Ser. No. 15/836,225, filed Dec. 8, 2017, which claims the benefit of priority, under 35 U.S.C. Section 119 to U.S. Provisional Patent Application Ser. No. 62/568,687, titled "Exposing Cryptographic Measurement of Peripheral Component Interconnect Express (PCIE) Device Controller Firmware," filed on Oct. 5, 2017, all of which are hereby incorporated by reference herein in their entirety.

TECHNICAL FIELD

Embodiments pertain to improvements in computer architectures, including improvements in computer bus architectures, such as Peripheral Component Interconnect Express (PCIe) devices and PCIe protocols to enable cryptographic measurements of components of the PCIe devices (e.g., firmware) and the reporting of those measurements to a host device across a PCIe interface.

BACKGROUND

PCIe is a high speed serial computer interconnect that connects peripheral devices, such as graphics cards, network cards, and the like, to a central processing unit (CPU) of a computing device. Peripherals connected via the PCIe bus communicate by sending packets across point-to-point communication channels called links. A link may be composed of one or more PCIe lanes that are comprised of differential signaling wire pairs. Peripherals may utilize one, four, eight, twelve, sixteen, or thirty two lanes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
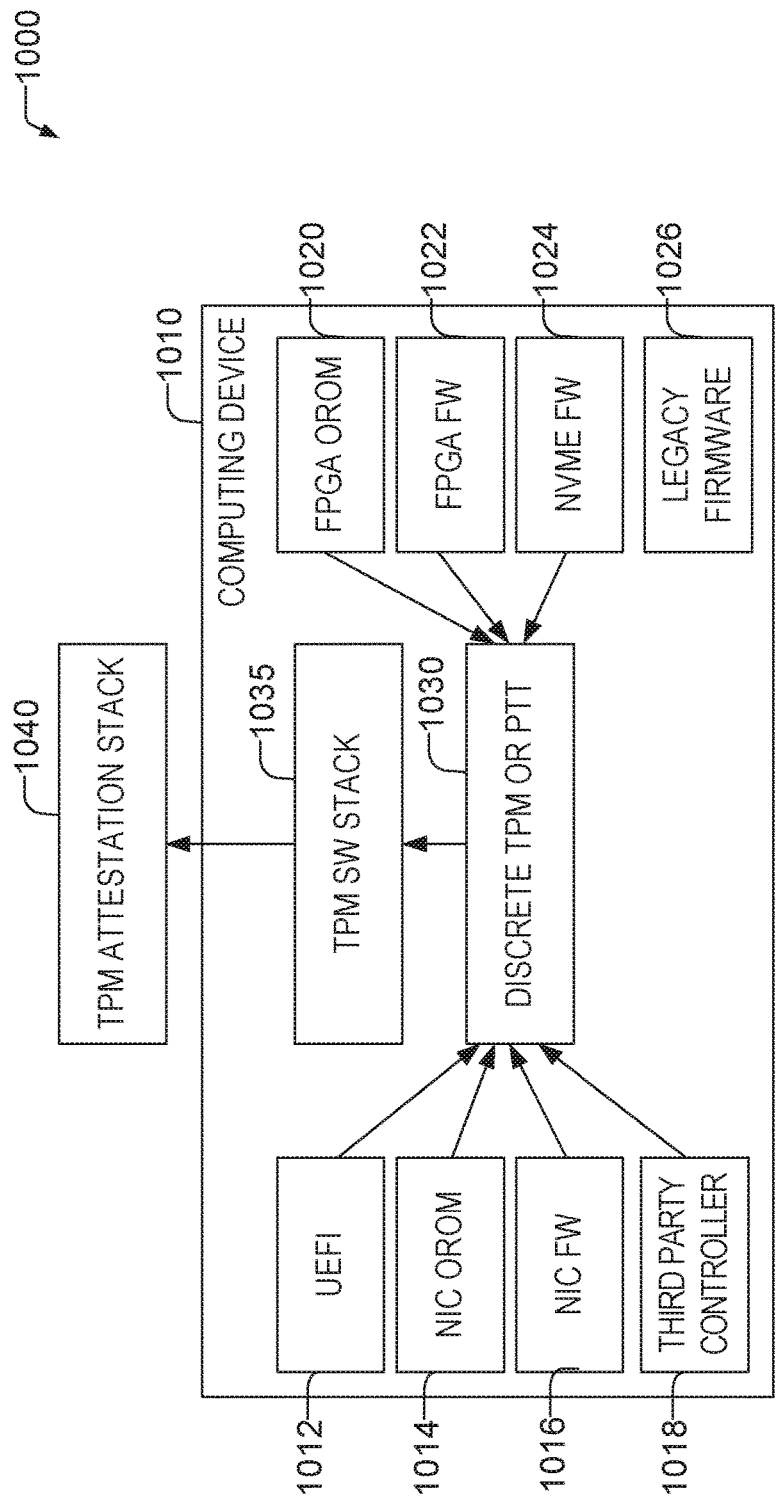
FIG. 1 shows a logical diagram of code object attestation according to some examples of the present disclosure.

One common vector for computer hackers includes the modification or replacement of trusted software to include malicious instructions or links to malicious instructions in a way that is not detectable to an end user or other components of a computer system. While these attacks are typically directed at a computing device's firmware (such as the Unified Extensible Firmware Interface (UEFI), the Basic Input Output System (BIOS), bootloader, or other low level components), the risk is also present for attackers to modify code on a peripheral device. Should an attacker compromise a peripheral device, the input and output data of a user sent to these devices may be compromised as a result. For example, if a display device is compromised, the display buffer (e.g., what is displayed to the user) may be accessed or modified by an attacker. In another example, a network interface card that is compromised may disclose the packets sent over that network interface card.

Disclosed examples include hardware components, peripheral devices, computing devices, systems, machine-readable mediums, and interconnect protocols that provide for code object measurement of a peripheral device and a method for accessing the measurements to verify integrity across a computing interconnect (e.g., PCIe). For example, a cryptographic processor of a PCIe endpoint (a peripheral) may take measurements (e.g., computing a hash value) of a code object (such as a firmware object) on the device prior to a processor of the PCIe endpoint executing the code object. This measurement may be placed in a register that is accessible to another component, such as a host operating system across a PCIe bus for interrogation. The host operating system may utilize an interconnect protocol, such as a PCIe protocol to access the measurement. The host operating system may then determine whether the measurement is acceptable or not, and take action if it is not acceptable.

As used herein a peripheral device is a device connected to a CPU across an interconnect and is an endpoint for one or more interconnect messages.". An endpoint function serves as an endpoint for one or more interconnect messages. Example peripheral devices include graphics cards, network interface cards (NICs), Wireless Local Area Network (WLAN) cards, storage devices, Universal Serial Bus (USB) devices, and the like.

In some examples, a processor (or other circuitry) on the peripheral device utilizes one or more cryptographic algorithms (e.g., a SHA256 or the like) to calculate measurements of a code object on a peripheral device. The measurement is typically a large number that reflects the contents of the software object. For example, prior to, or after, a software object (e.g., firmware) is loaded into a volatile memory for execution by a processor of the peripheral device (e.g., at boot), the cryptographic processor may calculate the measurement. In some examples, the cryptographic processor may be a hardware processor separate from the hardware processor that executes the software objects, but in other examples, it may be the same processor. In some examples, the measurement of one or more software objects may be trusted by the entity collecting the measurements if the identities are computed by an agent on the peripheral device that is itself trusted (e.g., an immutable agent or derived by a chain of trust to an immutable agent). In some examples, this component (e.g., the cryptographic processor) may be referred to as a Device Hardware Root of Trust for Measurement (RTM).

The cryptographic processor may store the measurement of one or more software objects in a hardware register called a DIGEST register. A measurement (also called a cryptographic measurement) may be a unique value produced by a function applied to the instructions in the software object and may be used to uniquely identify that software object. Even slight modifications of the software object will produce different cryptographic identities. In some examples, the measurement may be produced by a secure hash function (e.g., SHA256) applied to the instructions of the software object (e.g., the firmware). One of ordinary skill in the art with the benefit of the present disclosure will appreciate that cryptographic identifiers may be utilized other than SHA256.

In some examples, the DIGEST register may be exposed to another peripheral or to a host (e.g., a device in which the peripheral is installed) to allow the other peripheral device or the host to inspect the measurement and check it against cryptographic identities of accepted software objects. For example, the other peripheral device or the host may have the cryptographic measurements of acceptable software objects. If the measurement of the software object that is reported by the peripheral device does not match that of an accepted software object, the host may disable the device or take other action. In some examples, the DIGEST register may be read-only by the host (e.g., it may not be modified by the host). The DIGEST register may be implemented as a hardware based register and may be protected from modification by the software objects of the peripheral device. In some examples, the DIGEST register may only be modified by the cryptographic processor. In some examples, the DIGEST register may be reset to zero upon power up, and may only be written once until the next power cycle. In some examples, the DIGEST register may be reset to zero upon power up, and may be written once, and extended thereafter as described below. Some devices may reload firmware on a warm reset, whereas others may require a cold reset or D3 transition to reload the firmware. In these examples, if the firmware is reloaded upon a warm reset, the DIGEST register may be reset to zero. In some examples, a ROM version may be combined with a software object measurement.

For components with multiple software objects (e.g., multiple firmware objects), a single DIGEST register may be used capture multiple software components associated with the PCIe endpoint. This approach conserves the number of registers that are exposed to the host or other peripheral devices. As each component gets measured, the DIGEST register is updated to reflect the measurement of the software object. In these examples, the DIGEST register may be extended with the new measurement using an appropriate secure hash algorithm, instead of being overwritten. For example, a SHA256 EXTEND operation may be defined as
    REGISTER=SHA256 (REGISTER||measurement)
    where || represents a concatenation operation and SHA256 is defined in NIST FIPS PUB 180-4.

In these examples, the new measurement value is effectively concatenated with the current register value and passed thru a SHA256 operation. The result is stored as a new value of the register. The EXTEND operation above may be implemented in the cryptographic processor. For example, a 2 stage software object load (e.g., firmware load) may involve 3 writes to the DIGEST register when using a SHA256 hash algorithm:
1. ROM writes ROM version to DIGEST register
2. ROM computes SHA256 hash of stage 1 firmware and writes it to DIGEST register
3. Stage 1 firmware computes SHA256 hash of the stage 2 firmware and writes that value to the DIGEST register. The act of writing to the DIGEST register triggers the concatenation and secure hash operations as shown above.

In another example, if the controller firmware boot flow consists of a single firmware stage, EXTEND functionality is not needed. It may be replaced with a write once register. A program stored in ROM may compute the digest, combine it with ROM version and write the resulting value to the DIGEST register.

In other examples, rather than use one DIGEST register and extend the value for new software objects, multiple DIGEST registers may be implemented, each storing a different measurement of a different software object. In these examples, the PCIe configuration space may contain multiple instances of PCIe capability register blocks storing multiple instances of cryptographic measurements. In some examples, multiple DIGEST registers may each store a measurement of a particular software object, where the measurement is calculated using a different cryptographic algorithm in each register.

The measurement(s) may be exported through one or more PCIe extended capability structure(s). PCIe extended capability structures appear in the Physical function (PF) that is associated with a hardware processor serving as a controller of the peripheral device. In some examples, the PF may implement multiple instances of this capability structure. The PF may choose to implement multiple instances for example because the PF may choose to divide the software components into multiple groups and may choose to report digest values for each group separately in a separate PCIe extended capability structure. In this case, each instance of the PCIe capability structure is associated with a unique software object ID (e.g., at offset 11, Bits 5:0). In other examples, the PF may use multiple PCIe extended capability structures because the PF may be associated with multiple independent controllers. The device manufacturer may prefer to report the measurement of each controller software object image separately. As a result, the PF instantiates one Digest capability structure per controller. The software object ID field in each instance of the Digest Capability structure may be unique and may identify the particular software object identifier and the controller identifier. Additionally, the PF may utilize multiple PCIe extended capability structures because the software object load process may consist of multiple stages (e.g., n stages) and the PF may choose to report the measurement of each stage separately in different PCIe capability structures. Finally, the peripheral device may support algorithmic agility—that is, it may compute and report the measurement using more than one measurement algorithm. In this case, the PF instantiates one Digest capability structure per supported algorithm for every firmware ID.

In some examples, a PCIe capability structure may have a capability header:

| | Capability Header | |
|---|---|---|
| BIT LOCATIONS | DESCRIPTION | ATTRIBUTE |
| 15:0 | PCIe Capability ID In some examples, set to 023h to indicate a Designated Vendor-Specific Extended Capability (DVSEC). The value of this field is assigned by PCI | Read Only |
| 19:16 | Capability Version = 1. Defined by PCI Special Interest Group (SIG). | Read Only |
| 31:20 | Next Capability Offset | Read Only |
| 47:32 | DVSEC Vendor Id-the vendor ID associated with the vendor that defined the contents of this capability. Assigned by PCI SIG. | Read Only |
| 51:48 | DVSEC Revision- this field is a vendor-defined version number that indicates the version of the DVSEC structure. Implementations that comply with this version of the specification must report 1. Defined by this specification | Read Only |
| 63:52 | DVSEC Length-This field indicates the number of bytes in the entire DVSEC structure. In some examples, implementations may return 16 + N where N is the length of the digest field in bytes. | Read Only |
| 79:64 | DVSEC ID-A vendor defined ID that indicates the nature and format of the DVSEC structure. | Read Only |

| | Digest Capability Structure | |
|---|---|---|
| Byte Offsets | Register Description | Register Attribute |
| 9:0 | PCIe Capability header including the DVSEC header bytes (see the above table) | Read Only |
| 10 | Bit 0 (DIGEST_MODIFIED) The controller sets this bit whenever it modifies the contents of the DIGEST register. This bit must read 1 before the change to the DIGEST field is made visible to the host. In some examples, the host software cannot set this bit, but may clear this bit by writing one to it. This bit is set to 1 by hardware after a reset or power transition that results in DIGEST being cleared. | Read Write One to Clear |
| 11 | Bit 7 (DIGEST_VALID) = 1 implies that the measurement process is complete and DIGEST field holds the final measurement value. This field may be modified by the controller firmware, but is read-only to host software. This bit is cleared by hardware after a reset or power transition that results in DIGEST being cleared. Bit 6:5 may be reserved for future use Bits 4:0 may store the firmware ID. Each ID represents the logical grouping of software objects components that are measured as a single unit. The mapping between firmware ID field and the underlying firmware component is device specific. In some examples, this field may be implemented in hardware and controller firmware may not be able to modify it. In some examples, host software may assume that this field is static. | Read Only |
| 13:12 | TCG_ALG_ID-The algorithm used for computing DIGEST. Enumeration is defined in Trusted Computing Group Algorithm Registry (or some other registry). In some examples, this field may be implemented in hardware and controller firmware may not be able to modify it. Host software may assume that this field is static. If the controller implements algorithmic agility, it may expose n instances of this capability structure for each Firmware ID, where n is the number of supported algorithms. | Read Only |
| 15:14 | Reserved | |
| 15 + N:16 | DIGES-holds the measurement of the software objects that are measured as a single unit. The Firmware ID field identifies the software object or a logical grouping # of software objects that are measured as a single unit. N is the length of the digest in bytes. For example, N = 32 if the digest represents a SHA-256 measurement of the firmware image. | Read Only |

Digest Capability Structure

The DIGEST_MODIFIED and DIGEST_VALID flags may be utilized to ensure integrity in reading the measurement stored in the DIGEST. The DIGEST_VALID may be set once the cryptographic measurement is complete and placed in the DIGEST. In some examples, the controller (e.g., a processing device) of the peripheral device and the host may boot in parallel. The host may poll for DIGEST_VALID flag prior to consuming the DIGEST value. This will ensure that the pre-boot software does not consume an incomplete or invalid measurement value.

The Digest register read operation may not be atomic from the perspective of the host. A PCIe endpoint may support a controller reset or firmware reload without a corresponding host interface reset. In addition, the controller reset may happen due to a variety of other reasons that are not under the control of host software e.g. fatal error condition, out of band command, watchdog timer expiry, or the like. If the controller is reset without a corresponding host interface reset, it is possible that the DIGEST register contents may change while the host software is in the middle of the read operation. The DIGEST_MODIFIED flag helps to avoid this race condition. The peripheral device may set the DIGEST_MODIFIED flag anytime the DIGEST is modified (e.g., at power upon when its reset to zero or when a cryptographic software object measurement is put into the register). Host software should clear the DIGEST_MODIFIED flag before reading the DIGEST. After the host software has read all the bytes in the DIGEST register, the host software may consult DIGEST_MODIFIED. If DIGEST_MODIFIED is still zero, the software may assume the DIGEST value is valid. If the DIGEST_MODIFIED is set, the software should discard the previously read DIGEST value, clear DIGEST_MODIFIED, wait for DIGEST_VALID to be set and reread the DIGEST.

In some examples, the variable portion of the device configuration and policy data may not be included in the measurement. Configuration options refer to user settings that control how device operates. For a network interface card, this might be network addresses. For a storage device, this may be RAID configuration. These are configured by user and may vary from one device to another device. These settings may not be included in the measurement to prevent the measurement value from becoming brittle and hence less useful. Security software may use device specific mechanisms to access this data if needed. It is assumed that any software objects involved in returning the configuration data or policy are part of the previous measurement, which means they are included in the attestation and considered trustworthy. Any configuration data or policy data that is set up by the device or system vendor and not under end user control may be included in the DIGEST.

In some examples, the host may place a device in a power conserving mode (e.g., ACPI specification defined D3 Hot/D3 Cold state) or may reset the device. The peripheral device implementation may ensure that the DIGEST register, when read by the host software accurately reflects the measurement of software objects that are executing on the peripheral device. For example, if the same firmware stack is reloaded after a D3Hot to D0 transition, the DIGEST register value, if read when DIGEST_VALID=1, would not change across this transition. One way to achieve that is to reset the DIGEST register to zero at the beginning of the firmware load process so that it gets restored to the correct value during firmware load.

Some devices allow an invasive debug mode where by the debugger is granted low level access to the hardware and may be able to influence the security properties of the device. In some examples, the device may disable debug mode e.g., with one way immutable ASIC components such as on die one time programmable fuses. In some examples, the DIGEST register values may reflect that the device is in this mode. In some cases, the debug mode may allow the debugger the ability to influence the measurement process itself. When such a debug mode is known to be active during device reset (as determined by device specific mechanism such as strap), the hardware or ROM should initialize the DIGEST register to reset default value of 0 and lock it i.e. ensure it cannot be modified any entity, debug or otherwise. This is to prevent the debugger from reporting a false DIGEST value.

FIG. 1 shows a logical diagram 1000 of code object attestation according to some examples of the present disclosure. Computing device 1010 may include a number of components, such as a Unified Extensible Firmware Interface (UEFI) 1012, a network interface card (NIC) Option Read Only Memory (OROM) 1014, a NIC firmware 1016, a third party controller 1018, a field programmable gate array (FPGA) OROM 1020, a FPGA firmware object 1022, a Non-Volatile Memory Express (NVME) firmware 1024, and a legacy firmware 1026. In some examples the UEFI 1012, NIC OROM 1014, NIC FW 1016, third party controller firmware 1018, FPGA OROM 1020, FPGA FW 1022, and NVME FW 1024 may have measurements taken of their operational software objects and those measurements may be passed to a discrete Trusted Protection Module (TPM) or Platform Trust Technology (PTT) 1030. For example, some of the components may have measurements passed over a PCIe express interconnect (e.g., bus) to the TPM or PTT 1030. The TPM or PTT may pass those measurements to the TPM software stack 1035, which may then pass the measurements to the TPM attestation Stack 1040. The TPM stack may, in conjunction with higher level software and a remote attestation server, verify the integrity of (or attest to) the software and firmware components running on the system, and in particular, the software running on the PCIe peripherals.

Figure 2:
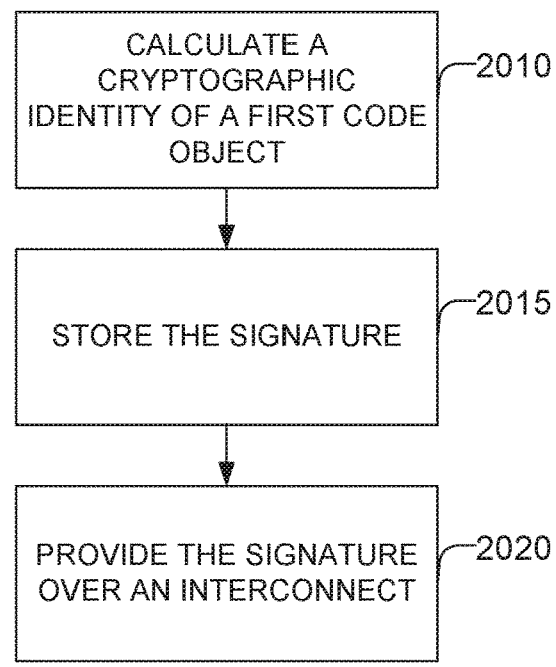
FIG. 2 shows a flowchart of a method of calculating a measurement of a software object and communicating it over an interconnect, such as a PCIe interconnect according to some examples of the present disclosure.

FIG. 2 shows a flowchart of a method 2000 of calculating a measurement of a software object and communicating it over an interconnect, such as a PCIe interconnect according to some examples of the present disclosure. Method 2000 may be performed at a peripheral device, such as a peripheral device functioning as an endpoint of a PCIe interconnect. At operation 2010, a processor of the peripheral device may calculate a measurement of a code object. The processor may be a general purpose processor and calculate the measurement using instructions in a ROM or other place, or may be a special purpose hardware processor. At operation 2015 the peripheral device may store the measurement. For example, in a hardware register of the peripheral device. In some examples, the measurement may be locked to prevent the measurements from being modifiable by future, mutable portions of the code object. At operation 2020 the peripheral device may provide the measurement (e.g., expose the hardware register) to another peripheral device or process (such as a host) over an interconnect (e.g., such as a PCIe interconnect). For example, the peripheral device may create and fill out a PCIe extended capability data structure. In some examples, the peripheral device may perform the method 2000 for a number of different software objects and store the values in different registers. In other examples, at operation 2015, if multiple software objects are measured, the value of the register is extended as previously described. In some examples, the peripheral device may perform the method 2000 at various times, such as a boot time, a transition from a state where a software object is not loaded to a state in which a software object is loaded, a reset condition, and/or the like.

Figure 3:
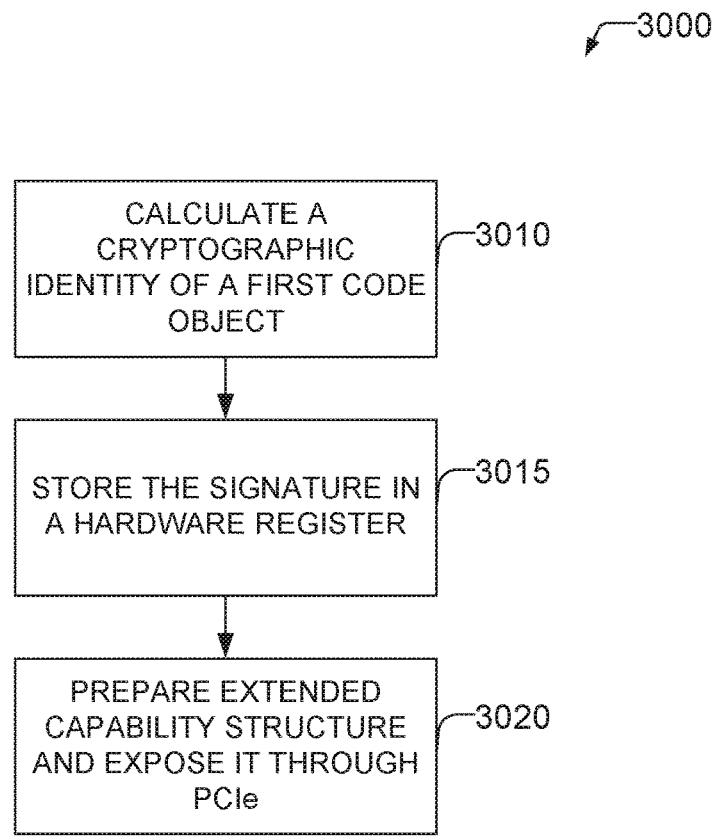
FIG. 3 shows a flowchart of a method of calculating a measurement of a software object and communicating it over an interconnect, such as a PCIe interconnect according to some examples of the present disclosure.

FIG. 3 shows a flowchart of a method 3000 of calculating a measurement of a software object and communicating it over an interconnect, such as a PCIe interconnect. Method 3000 is one example of method 2000. Method 3000 may be performed at a peripheral device, such as a peripheral device functioning as an endpoint of a PCIe interconnect. At operation 3010, a processor of the peripheral device may calculate a measurement of a code object. The processor may be a general purpose processor and calculate the measurement using instructions in a ROM or other place, or may be a special purpose hardware processor. At operation 3015 the peripheral device may store the measurement in a hardware register of the peripheral device. At this point, the measurement may be locked from modification until a reset of the device. At operation 3020 the peripheral device may prepare a PCIe extended capability structure and provide the measurement (e.g., expose the hardware register) to another peripheral device or process (such as a host) over a PCIe interconnect through that structure. In some examples, the peripheral device may perform the method 3000 for a number of different software objects and store the values in different registers. In other examples, at operation 3015, if multiple software objects are measured, the value of the register is extended as previously described. In some examples, the peripheral device may perform the method 3000 at various times, such as a boot time, a transition from a state where a software object is not loaded to a state in which a software object is loaded, a reset condition, and/or the like.

For FIGS. 2 and 3, in some examples, as part of preparing the extended capability structure, the peripheral may set the DIGEST_VALID flag to indicate that the cryptographic measurement is complete. For examples in which, multiple measurements are extended into a single register, in some examples, each time a measurement is complete this flag may be set. In these examples the DIGEST_VALID flag is cleared both on reset and when a new software object is about to be loaded and measured. In other examples, only after all software objects are loaded and measured is the flag set. In some examples, the DIGEST_MODIFIED flag may be cleared by the peripheral prior to the operations of FIGS. 2 and 3.

Figure 4:
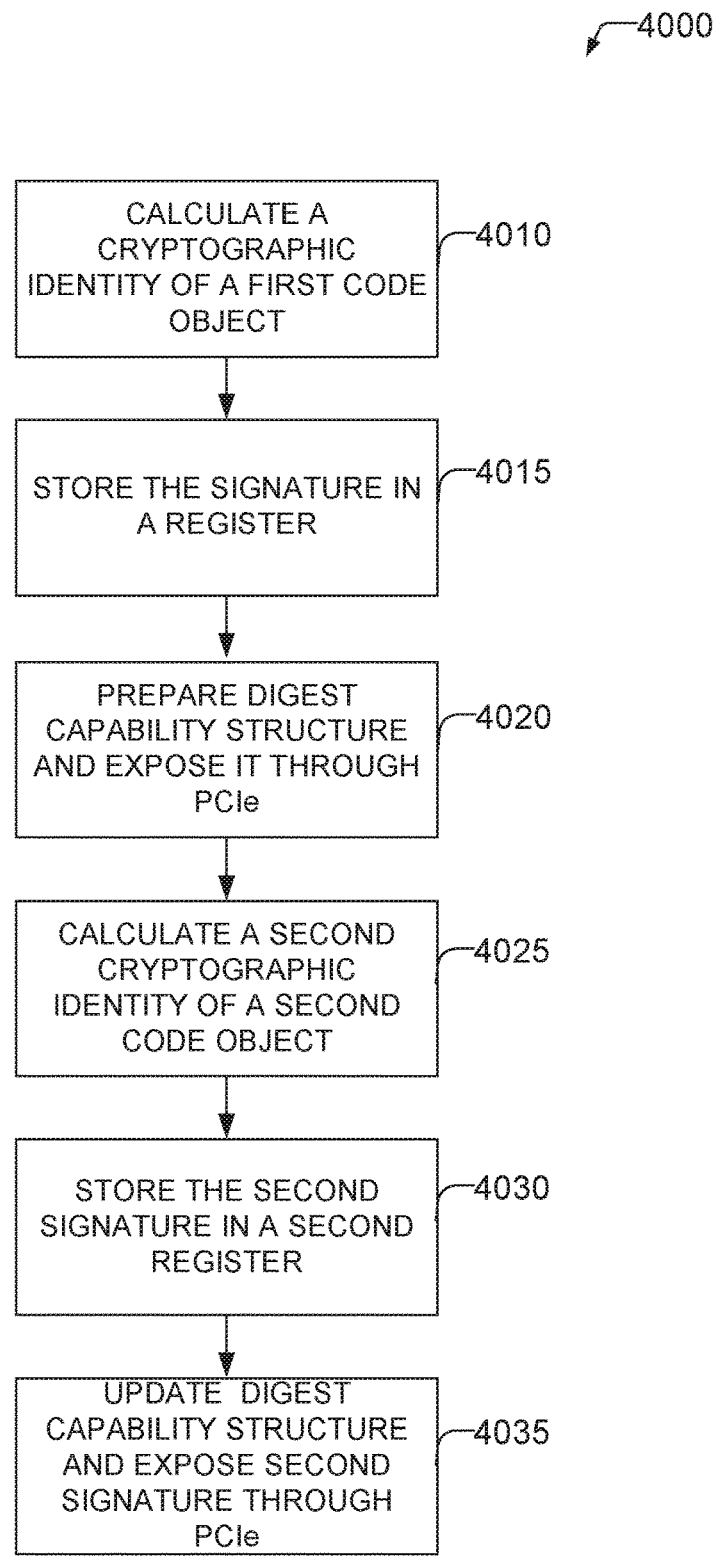
FIG. 4 shows a flowchart of a method of calculating a measurement of multiple software objects and communicating them over an interconnect, such as a PCIe interconnect according to some examples of the present disclosure.

FIG. 4 shows a flowchart of a method 4000 of calculating a measurement of multiple software objects and communicating them over an interconnect, such as a PCIe interconnect according to some examples of the present disclosure. Method 4000 is one example of methods 2000 and 3000. Method 4000 may be performed at a peripheral device, such as a peripheral device functioning as an endpoint of a PCIe interconnect. At operation 4010, a processor of the peripheral device may calculate a measurement of a first code object. The processor may be a general purpose processor and calculate the measurement using instructions in a ROM or other place, or may be a special purpose hardware processor. At operation 4015 the peripheral device may store the measurement in a hardware register of the peripheral device. The measurement may be locked to prevent future modification until a reset or other event of the device. At operation 4020 the peripheral device may prepare a PCIe extended capability structure and provide the measurement (e.g., expose the hardware register) to another peripheral device or process (such as a host) over a PCIe interconnect through that structure. At operation 4025, a processor of the peripheral device may calculate a measurement of a second code object. At operation 4030 the peripheral device may store the measurement in a second hardware register of the peripheral device. The measurement may be locked to prevent future modification until a reset or other event of the device. At operation 4035 the peripheral device may prepare a PCIe extended capability structure and provide the second measurement (e.g., expose the hardware register) to another peripheral device or process (such as a host) over a PCIe interconnect through that structure.

Figure 5:
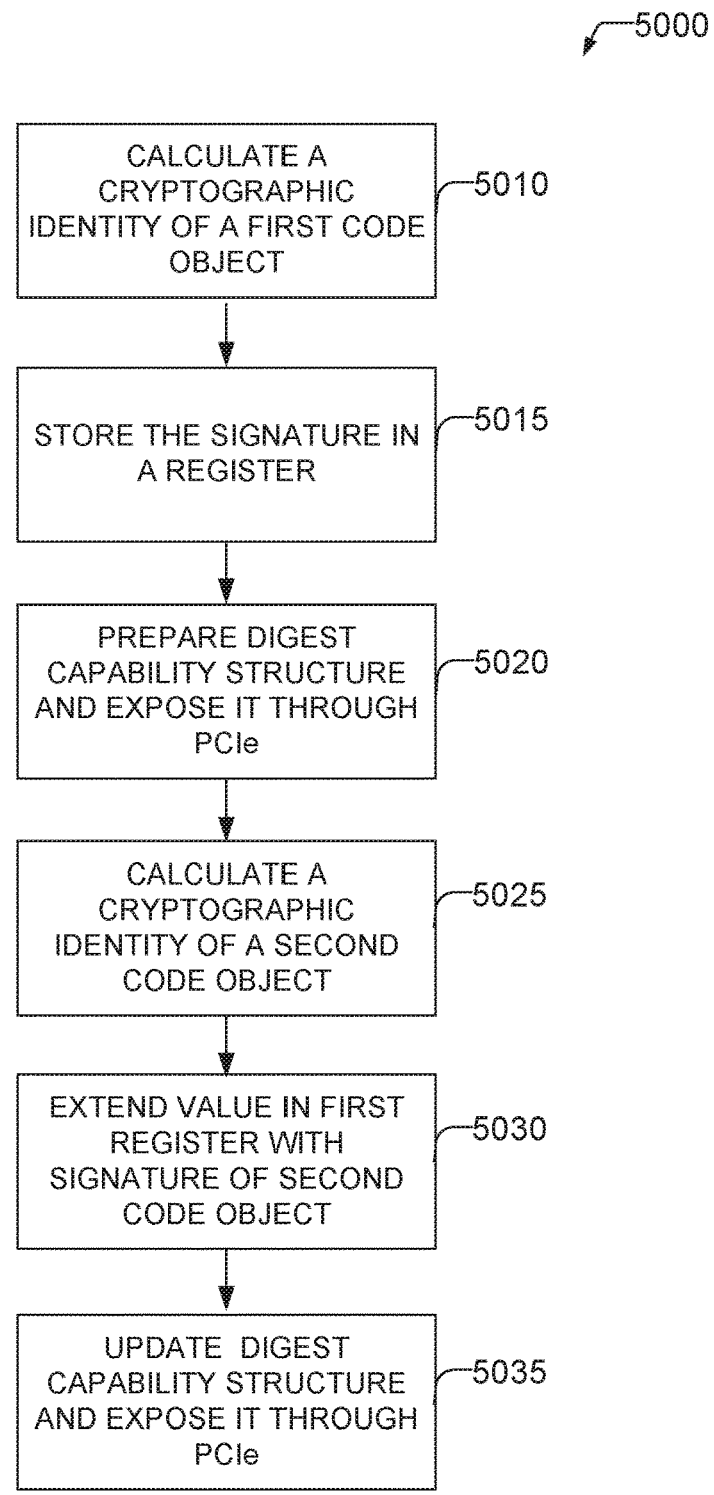
FIG. 5 shows a flowchart of another method of calculating a measurement of multiple software objects and communicating them over an interconnect, such as a PCIe interconnect according to some examples of the present disclosure.

FIG. 5 shows a flowchart of another method 5000 of calculating a measurement of multiple software objects and communicating them over an interconnect, such as a PCIe interconnect. Method 5000 is one example of methods 2000 and 3000. Method 5000 may be performed at a peripheral device, such as a peripheral device functioning as an endpoint of a PCIe interconnect. At operation 5010, a processor of the peripheral device may calculate a measurement of a first code object. The processor may be a general purpose processor and calculate the measurement using instructions in a ROM or other place, or may be a special purpose hardware processor. At operation 5015 the peripheral device may store the measurement in a hardware register of the peripheral device. The measurement may be locked to prevent future modification until a reset or other event of the device. At operation 5020 the peripheral device may prepare a PCIe extended capability structure and provide the measurement (e.g., expose the hardware register) to another peripheral device or process (such as a host) over a PCIe interconnect through that structure. At operation 5025, a processor of the peripheral device may calculate a measurement of a second code object. At operation 5030 the peripheral device may extend the value in the first register with the measurement of the second code object. The measurement may be locked to prevent future modification until a reset or other event of the device. At operation 5035 the peripheral device may update the PCIe extended capability structure and provide the extended measurement (e.g., expose the hardware register) to another peripheral device or process (such as a host) over a PCIe interconnect through that structure.

Figure 6:
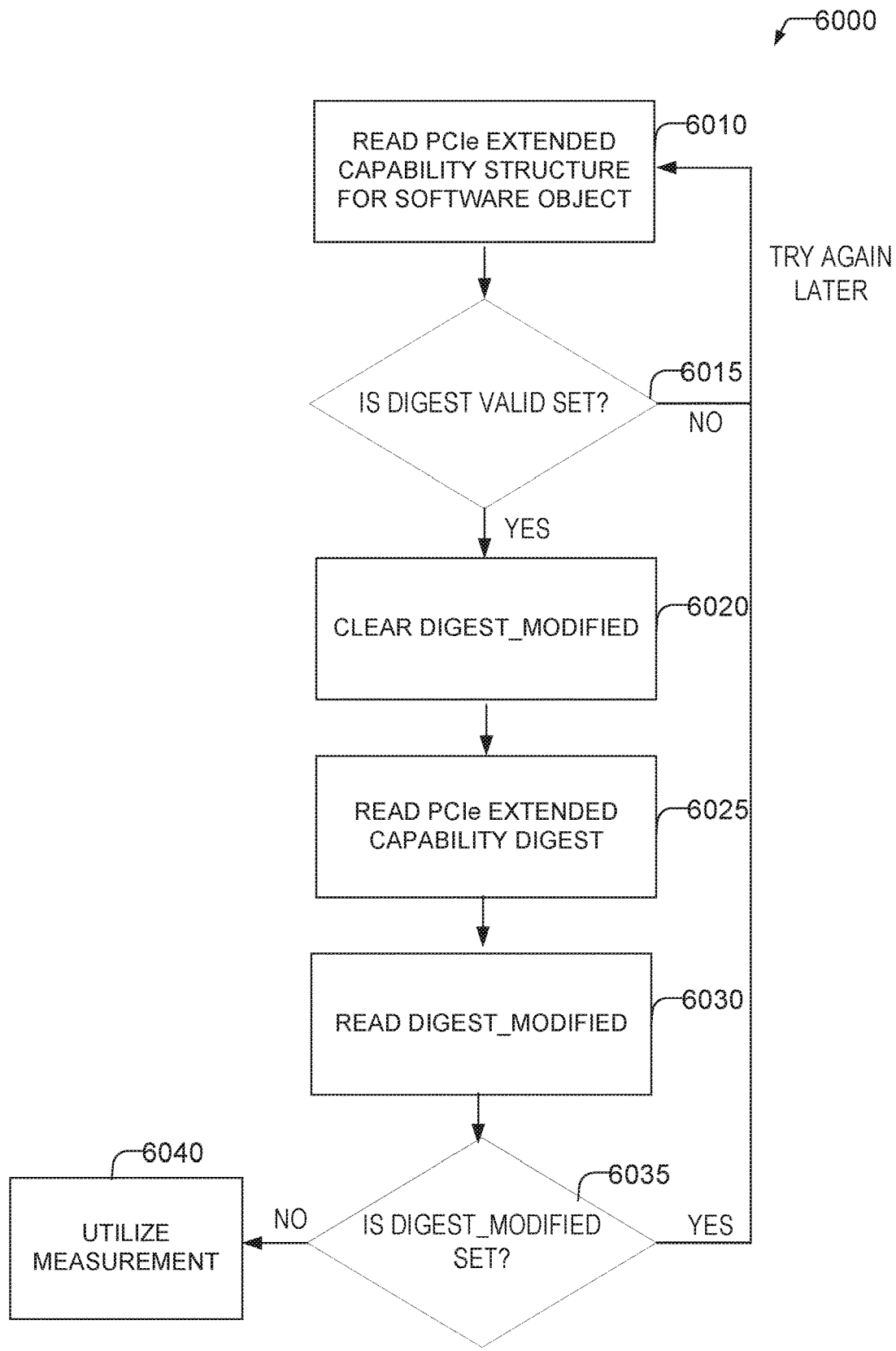
FIG. 6 shows a flowchart of a method of a host or another peripheral obtaining the measurement of one or more code objects on the peripheral device according to some examples of the present disclosure.

FIG. 6 shows a flowchart of a method 6000 of a host or another peripheral obtaining the measurement of one or more code objects on the peripheral device according to some examples of the present disclosure. At operation 6010 the host may read the PCIe Extended Capability structure through the PCIe interface. For example, by transaction layer packet configuration read messages.

At operation 6015, the host checks to see if the DIGEST_VALID flag is set, indicating that the software object has been measured. If the DIGEST_VALID flag is not set, the host may try again later. At operation 6020 if the DIGEST_VALID flag is set, the host clears the DIGEST_MODIFIED flag (e.g., by writing one to it). At operation 6025, the host reads the PCIe Extended Capability Digest. At operation 6030 the host reads the DIGEST_MODIFIED flag again. At operation 6035, the DIGEST_MODIFIED flag is checked, and if it is clear, then at operation 6040, the host may utilize the measurement. For example, the host may check the measurement against known good measurement values. If there is a match, the peripheral may be allowed to continue to boot. If there is not a match, the peripheral may be deactivated. If the DIGEST_MODIFIED flag is set at operation 6035, it indicates the device changed the DIGEST after operation 6020 was performed. The host may go back to operation 6010 and perform operations 6010-6035 again.

Figure 7:
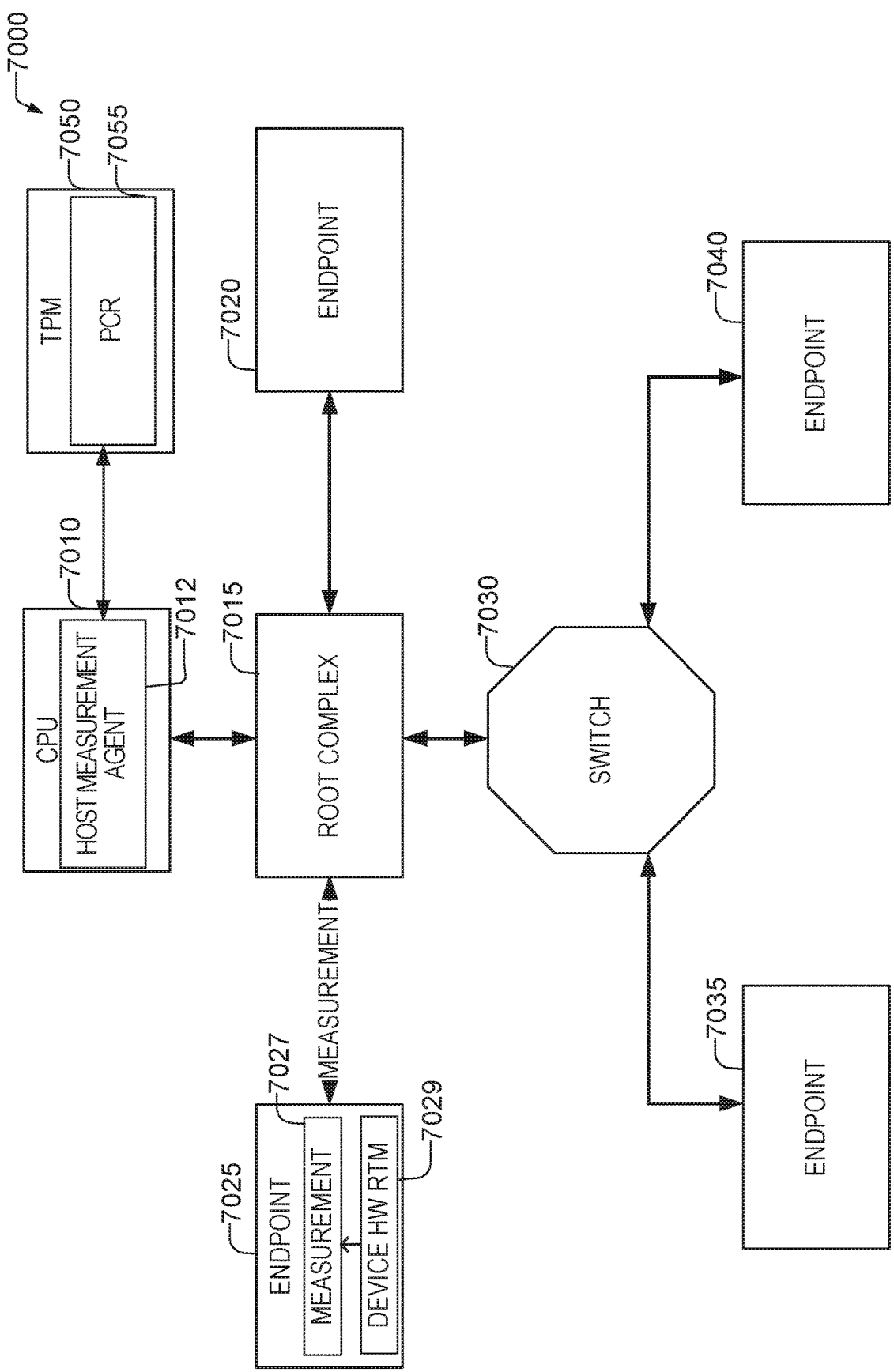
FIG. 7 shows an example schematic of a PCIe topology according to some examples of the present disclosure.

FIG. 7 shows an example schematic of a PCIe topology 7000 according to some examples of the present disclosure. CPU 7010 is a central processing unit and may execute one or more software instructions. CPU 7010 may communicate with one or more of the other components of FIG. 7 across the PCIe interconnect. An interconnect may be a communication system that transfers data between components inside a computer. CPU 7010 may be communicatively coupled to an endpoint directly (e.g., a graphics card across a 16 lane connection), or may be communicatively coupled to other devices through a root complex 7015. Root complex 7015 communicatively connects the process and memory subsystems (not shown for clarity) to a PCIe switch fabric. Root complex 7015 may generate PCIe transaction requests on behalf of the CPU 7010, which may be interconnected to the root complex 7015 through a local interconnect. The root complex 7015 may be implemented as a separate microprocessor, or may be integrated with the CPU 7010. Endpoints 7025 and 7020 may be directly connected to the root complex 7015. Endpoints are functions of peripheral devices that mark endpoints of PCIe communications. Switch 7030 may be utilized to create additional connections to additional endpoints, such as endpoints 7035 and 7040. In some examples, a Hardware Root of Trust for Measurement 7029 may calculate one or more measurements 7027 of software objects running on the device (e.g., device 7025). In FIG. 7 one or more, or all of the endpoints 7020, 7035, 7040, and 7025 may have a hardware root of trust for measurement calculating measurements for code objects, but for clarity those components are only shown for endpoint 7025. These measurements may be transferred across the PCIe interconnect to the host, e.g., the CPU running a host measurement agent 7012. CPU 7010 may also communicate with, and receive measurements from, or store measurements to the TPM 7050. TPM may have one or more Platform Configuration Registers (PCR)s such as PCR 7055. PCR 7055 may store one or more measurements of host software, including PCIe endpoint measurements and the like.

Figure 8:
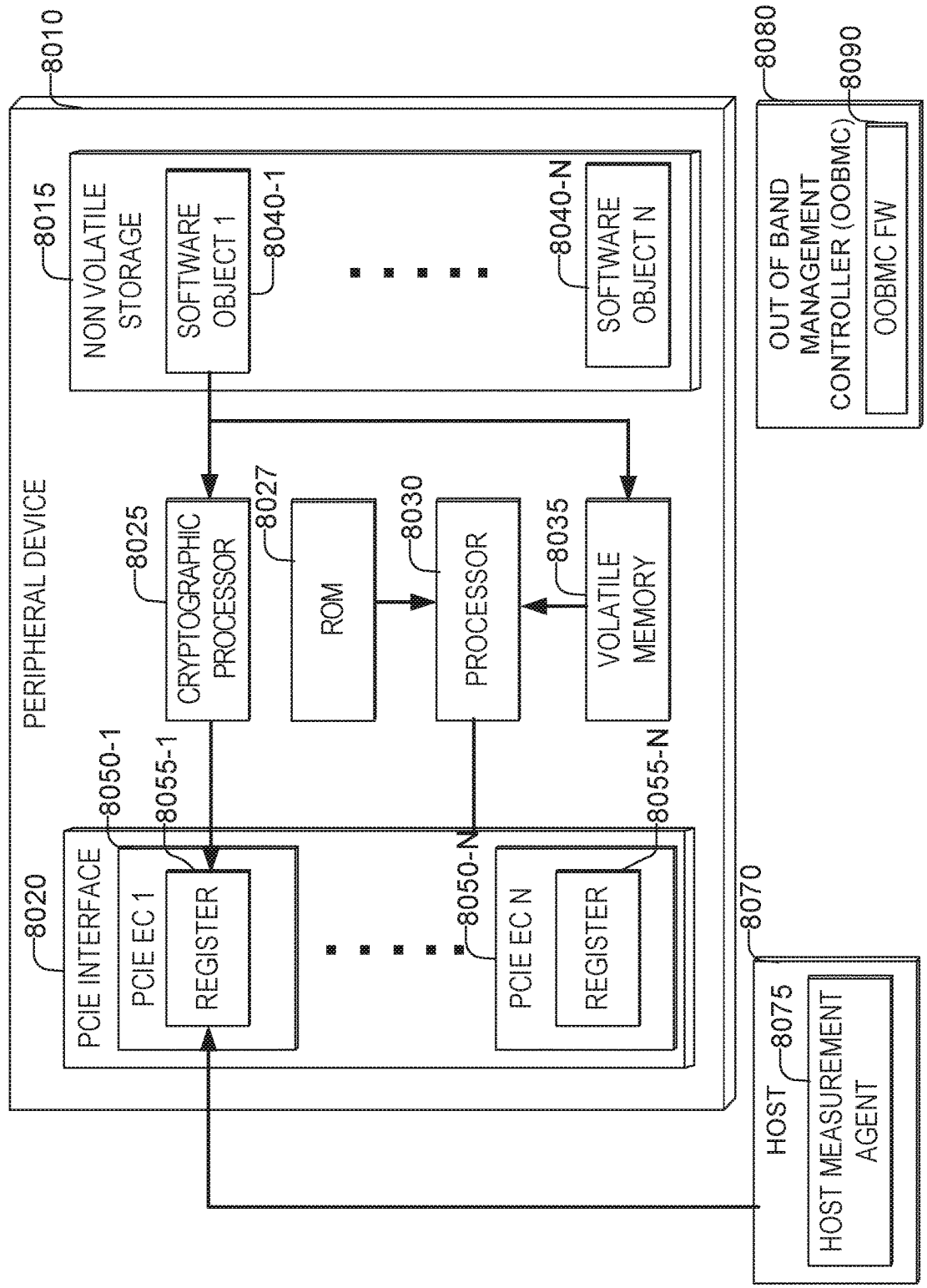
FIG. 8 shows a schematic of a peripheral device (e.g., a PCIe endpoint) according to some examples of the present disclosure.

FIG. 8 shows a schematic of a peripheral device (e.g., a PCIe endpoint) 8010 according to some examples of the present disclosure. Peripheral device has non-volatile storage 8015 where software objects 1 . . . N (8040-1-8040-N) may be stored—(where N is any number). At initial boot of the peripheral device 8010, in some examples a Mask ROM 8027 may be executed by the processor 8030. This ROM may instruct the processor 8030 to copy a first software object (one of 8040-1-8040-N) into volatile memory 8035. In some examples, the volatile memory 8035 may be internal Static Random Access Memory (SRAM). Prior to, contemporaneously with, or after the loading of the software objects into volatile memory 8035, the cryptographic processor 8025 (e.g., the device hardware RTM)) or processor 8030 (depending on the implementation) may calculate a cryptographic measurement (i.e. calculate the measurement) of the software objects. For example, by applying a secure hash algorithm to the data in the software objects. Example algorithms include SHA-0, SHA-1, SHA-2, SHA-3, MD5, and the like. The cryptographic processor 8025 may calculate the measurement of the software objects, and in some examples, may also include in the measurement, data critical to the execution state of the device. In some examples, the measurement may not include (that is, may exclude) software code and data that is not critical to the execution state of the peripheral device and that will make the measurement fragile (e.g., change without notification to the host).

As noted previously, the cryptographic processor 8025 may be a dedicated hardware processor. In some examples, cryptographic processor 8025 may be an Application Specific Integrated Circuit (ASIC) mask ROM including ASIC logic and registers.

These measurements may be copied to registers 8055-1 through 8055-N of corresponding PCIe extended capability structures, such as PCIe extended capability structures 8050-1 through 8050-N. Registers 8055-1 through 8055-N may be read only to the host 8070 and may contain a locking mechanism that allows the cryptographic processor to lock the values once they are set to prevent further modification. Registers 8055-1 through 8055-N may only be modifiable after performing a reset that causes the RTM (cryptographic processor 8025) to re-execute. In some examples, the cryptographic processor 8025 and/or processor 8030 may optionally perform cryptographic authentication of one or more of the software objects 8040-1 through 8040-N from the internal memory.

Once the cryptographic identities are calculated and stored, the ROM 8027 or cryptographic processor 8025 may pass control to the instructions in the first software object loaded in volatile memory 8035. If there are subsequent software objects that are loaded, the cryptographic processor 8025 and/or the processor 8030 may calculate additional cryptographic identities of those objects and store them in hardware registers accessible over the PCIe interface. For example, a first firmware object may continue the peripheral device measurement process by copying the next software object (8040-1-8040-N) into internal memory. The first firmware object then instructs the processor 8030 or the cryptographic processor 8025 to hash the next software object (e.g., firmware object 2) from internal memory and place the resultant hash into the next register in PCIe Configuration Space. This register is then locked, preventing any further modification of the hash until reset. The device may choose to also perform cryptographic authentication of the next stage software object from internal memory and so on until the boot sequence is complete.

Note that in some examples, there may be an Out Of Band Management Controller (OOBMC) 8080 with PCI Express interface that executes an OOBMC firmware 8090 independent of the firmware executed by the PCIe Controller ASIC. In this case, the OOBMC firmware 8090 may be exposed to the host in similar manner.

The PCIe interface 8020 may implement physical, transactional, and other layers of the PCIe express protocol. In some examples, one or more of the layers may be implemented by the processor 8030. In some examples, the cryptographic processor 8025 may be implemented by the processor 8030.

The calculated measurements may then be read by the host 8070, such as an operating system executing on a CPU. In some examples, a host measurement agent 8075 may collect these measurements. This agent may be responsible for reading the measurement of software objects in devices and peripherals in the computing device or system and using them to determine the validity of the device, or, aggregating the information as part of a larger attestation of the platform by inserting the device measurement into a TPM platform configuration register. In some examples, the host measurement agent is comprises of pre-boot software such as a UEFI Basic Input Output System. In some examples, the host measurement agent 8075 may read all the registers, concatenate them, compute the appropriate secure hash operation and extend the resulting output, H0 to the appropriate TPM PCR. For example:

$$H0 = \text{HASH}(\text{DIGEST0}\|\text{DIGEST1}\|\text{DIGEST2} \ldots \|\text{DIGESTN})$$

where DIGESTN is the DIGEST field in the N'th register 8055-N, and where ‖ represents the concatenation operation, and the HASH( ) is an appropriate secure hash algorithm (e.g., SHA2).

Figure 9:
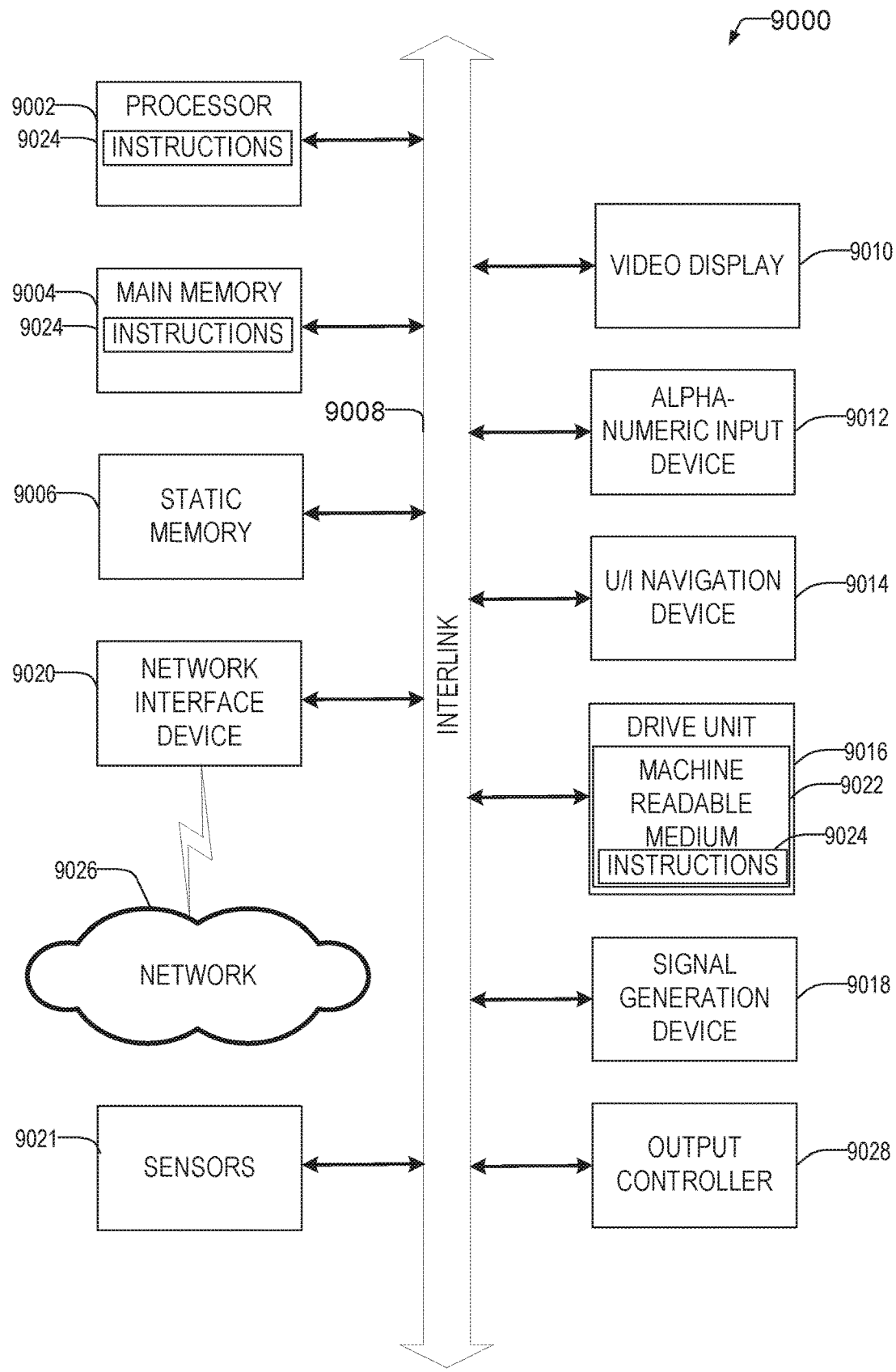
FIG. 9 is a block diagram illustrating an example of a machine upon which one or more embodiments may be implemented.

FIG. 9 illustrates a block diagram of an example machine 9000 upon which any one or more of the techniques (e.g., methodologies) discussed herein may perform. In alternative embodiments, the machine 9000 may operate as a standalone device or may be connected (e.g., networked) to other machines. Machine 9000 may include one or more peripherals, such as shown in FIG. 8. In some examples, the components of machine 9000 may be a peripheral. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a peripheral, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 9000 may include one or more of the components of FIG. 1, execute any of the methods of FIGS. 2-6, implement any of the components of FIG. 7, be configured to be a peripheral such as at FIG. 8, and the like. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may further include a display unit 9010, an alphanumeric input device 9012 (e.g., a keyboard), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 9024 may further be transmitted or received over a communications network 9026 using a transmission medium via the network interface device 9020. The Machine 9000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques. In some examples, the network interface device 9020 may wirelessly communicate using Multiple User MIMO techniques.

OTHER NOTES AND EXAMPLES

Example 1 is a peripheral device comprising: non-volatile storage that includes a code object; one or more hardware processors that, when in operation, are communicatively coupled with the non-volatile storage and configured to: calculate a measurement of the code object; and make the measurement available to a second device over a Peripheral Interconnect Express (PCIe) interconnect.

In Example 2, the subject matter of Example 1 optionally includes wherein the code object is a firmware object.

In Example 3, the subject matter of any one or more of Examples 1-2 optionally include wherein the peripheral device is a network interface card.

In Example 4, the subject matter of any one or more of Examples 1-3 optionally include wherein the one or more hardware processors are configured to make the measurement available to the second device over the PCIe interconnect through a PCIe extended capability structure.

In Example 5, the subject matter of any one or more of Examples 1-4 optionally include a hardware register, and wherein the one or more hardware processors are configured to at least store the measurement in the hardware register.

In Example 6, the subject matter of Example 5 optionally includes a second hardware register; wherein the non-volatile storage comprises a second code object; and wherein the one or more hardware processors are configured to: calculate a second measurement of the second code object; store the second measurement in the second hardware register; and make the contents of the second register available to the second device over the PCIe interconnect.

In Example 7, the subject matter of any one or more of Examples 1-6 optionally include wherein the non-volatile storage comprises a second code object; and wherein the one or more hardware processors are configured to: calculate a second measurement of the second code object; and extend the measurement with the second measurement.

In Example 8, the subject matter of any one or more of Examples 1-7 optionally include wherein to calculate the measurement of the code object the one or more hardware processors is to at least calculate a secure hash of the code object.

In Example 9, the subject matter of any one or more of Examples 1-8 optionally include wherein the one or more hardware processors are configured to: set an indicator to indicate when the measurement of the code object has been completed and the measurement is present in a location accessible to the second device.

Example 10 is a Peripheral Interconnect Express (PCIe) endpoint device comprising: a hardware register; a first hardware processor configured to: calculate a measurement of a firmware object of the PCIe endpoint device; store the measurement in the hardware register; and expose the hardware register to a host device over a PCIe interconnect using a PCIe extended capability data structure; and a second hardware processor configured to execute instructions in the firmware object.

In Example 11, the subject matter of Example 10 optionally includes a second hardware register; and wherein the first hardware processor is configured to: calculate a second measurement of a second firmware object; store the second measurement in the second hardware register; and expose the second hardware register to a second device over a PCIe interconnect using a PCIe extended capability data structure.

In Example 12, the subject matter of any one or more of Examples 10-11 optionally include wherein the measurement comprises a cryptographic measurement.

In Example 13, the subject matter of Example 12 optionally includes wherein the measurement comprises a secure hash algorithm.

In Example 14, the subject matter of any one or more of Examples 10-13 optionally include wherein the first hardware processor is configured to at least: calculate a second measurement of a second firmware object; and store the second measurement in the hardware register via application of a secure hash algorithm to a value calculated by a logical concatenation of the value stored in the hardware register and the second measurement.

In Example 15, the subject matter of any one or more of Examples 10-14 optionally include wherein a value of the hardware register is set to zero upon a reset of the PCIe endpoint device.

In Example 16, the subject matter of any one or more of Examples 10-15 optionally include wherein the PCIe endpoint device further comprises a network interface to a computer network.

In Example 17, the subject matter of any one or more of Examples 10-16 optionally include wherein the PCIe endpoint device further comprises a Graphics Processing Unit (GPU).

In Example 18, the subject matter of any one or more of Examples 10-17 optionally include wherein the PCIe extended capability data structure includes a capability header and a capability structure.

In Example 19, the subject matter of any one or more of Examples 10-18 optionally include wherein the PCIe extended capability data structure includes a digest valid flag, and wherein the first hardware processor is configured to set the digest valid flag after the measurement is stored in the hardware register.

In Example 20, the subject matter of Example 19 optionally includes wherein the digest valid flag is cleared at a reset of the PCIe endpoint device.

Example 21 is a method of providing a firmware measurement of an endpoint device across a Peripheral Interconnect Express (PCIe) interconnect, the method comprising: calculating a cryptographic firmware measurement of a firmware object of the endpoint device; storing the cryptographic firmware measurement of the firmware object of the endpoint device in a PCIe capability data structure.

In Example 22, the subject matter of Example 21 optionally includes wherein calculating the cryptographic firmware measurement comprises using a secure hash algorithm.

In Example 23, the subject matter of any one or more of Examples 21-22 optionally include wherein the cryptographic firmware measurement is stored in the PCIe capability data structure by mapping a field in the PCIe capability data structure to a hardware register.

In Example 24, the subject matter of any one or more of Examples 21-23 optionally include wherein the method further comprises: storing a second cryptographic firmware measurement of a second firmware object in a second PCIe capability data structure.

In Example 25, the subject matter of any one or more of Examples 21-24 optionally include wherein the method further comprises: modifying the cryptographic firmware measurement by extending the value to include a second cryptographic measurement of a second firmware object.

In Example 26, the subject matter of any one or more of Examples 21-25 optionally include wherein the cryptographic firmware measurement comprises a secure hash algorithm.

Example 27 is at least one machine-readable medium, comprising instructions, which, when performed by a processor, causes the processor to perform operations to: calculate a measurement of a firmware object; store the measurement in a memory; and make the measurement available to a second device over a Peripheral Interconnect Express (PCIe) interconnect by exposing a configuration data structure over the PCIe interconnect.

In Example 28, the subject matter of Example 27 optionally includes wherein the configuration data structure comprises a PCIe extended capability structure.

In Example 29, the subject matter of any one or more of Examples 27-28 optionally include wherein the memory is a hardware register.

In Example 30, the subject matter of any one or more of Examples 27-29 optionally include wherein the operations further comprise: calculating a second measurement of a second firmware object; storing the second measurement in the memory; and providing the contents of the memory to the second device over the PCIe interconnect.

In Example 31, the subject matter of any one or more of Examples 27-30 optionally include wherein the operations further comprise: calculating a second measurement of a second firmware object; and modifying a value stored in the memory based upon the second measurement.

In Example 32, the subject matter of any one or more of Examples 27-31 optionally include wherein the measurement is a secure hash.

In Example 33, the subject matter of any one or more of Examples 27-32 optionally include wherein the operations further comprise: setting an indicator to indicate when the measurement of the firmware object has been completed and the measurement is present in a location accessible to the second device.

In Example 34, the subject matter of any one or more of Examples 27-33 optionally include wherein the machine-readable medium is at least partially implemented in hardware by logic gates.

In Example 35, the subject matter of any one or more of Examples 27-34 optionally include wherein the machine-readable medium is at least partially implemented in microcode.

In Example 36, the subject matter of any one or more of Examples 27-35 optionally include wherein the machine-readable medium is at least partially implemented as firmware.

Example 37 is a device for providing a firmware measurement of an endpoint device across a Peripheral Interconnect Express (PCIe) interconnect, the device comprising: means for calculating a cryptographic firmware measurement of a firmware object of the endpoint device; means for storing the cryptographic firmware measurement of the firmware object of the endpoint device in a PCIe capability data structure.

In Example 38, the subject matter of Example 37 optionally includes wherein the means for calculating the cryptographic firmware measurement comprises using a secure hash algorithm.

In Example 39, the subject matter of any one or more of Examples 37-38 optionally include wherein the cryptographic firmware measurement is stored in the PCIe capability data structure by means for mapping a field in the PCIe capability data structure to a hardware register.

In Example 40, the subject matter of any one or more of Examples 37-39 optionally include wherein the device further comprises: means for storing a second cryptographic firmware measurement of a second firmware object in a second PCIe capability data structure.

In Example 41, the subject matter of any one or more of Examples 37-40 optionally include wherein the device further comprises: means for modifying the cryptographic firmware measurement by extending the value to include a second cryptographic measurement of a second firmware object.

In Example 42, the subject matter of any one or more of Examples 37-41 optionally include wherein the cryptographic firmware measurement comprises a secure hash algorithm.

Example 43 is a method, performed by a peripheral device, for providing a secure measurement, the method comprising: calculating a measurement of a code object of a PCIe device; and making the measurement available to a second device over a Peripheral Interconnect Express (PCIe) interconnect.

In Example 44, the subject matter of Example 43 optionally includes wherein the code object is a firmware object.

In Example 45, the subject matter of any one or more of Examples 43-44 optionally include wherein the peripheral device is a network interface card.

In Example 46, the subject matter of any one or more of Examples 43-45 optionally include wherein making the measurement available to the second device over the PCIe interconnect comprises utilizing a PCIe extended capability structure.

In Example 47, the subject matter of any one or more of Examples 43-46 optionally include wherein the method comprises storing the measurement in the hardware register.

In Example 48, the subject matter of Example 47 optionally includes calculating a second measurement of a second code object; storing the second measurement in a second hardware register; and making the contents of the second register available to the second device over the PCIe interconnect.

In Example 49, the subject matter of any one or more of Examples 43-48 optionally include wherein the method comprises: calculating a second measurement of the second code object; and extending the measurement with the second measurement.

In Example 50, the subject matter of any one or more of Examples 43-49 optionally include wherein calculating the measurement of the code object comprises calculating a secure hash of the code object.

In Example 51, the subject matter of any one or more of Examples 43-50 optionally include wherein the method comprises: setting an indicator to indicate when the measurement of the code object has been completed and the measurement is present in a location accessible to the second device.

Example 52 is at least one machine-readable medium performed by a peripheral device for providing a secure measurement, the machine readable medium comprising instructions, when performed by a machine, cause the machine to perform operations comprising: calculating a measurement of a code object of a PCIe device; and making the measurement available to a second device over a Peripheral Interconnect Express (PCIe) interconnect.

In Example 53, the subject matter of Example 52 optionally includes wherein the code object is a firmware object.

In Example 54, the subject matter of any one or more of Examples 52-53 optionally include wherein the peripheral device is a network interface card.

In Example 55, the subject matter of any one or more of Examples 52-54 optionally include wherein the operations of making the measurement available to the second device over the PCIe interconnect comprises utilizing a PCIe extended capability structure.

In Example 56, the subject matter of any one or more of Examples 52-55 optionally include wherein the operations comprise storing the measurement in the hardware register.

In Example 57, the subject matter of Example 56 optionally includes wherein the operations comprise: calculating a second measurement of a second code object; storing the second measurement in a second hardware register; and making the contents of the second register available to the second device over the PCIe interconnect.

In Example 58, the subject matter of any one or more of Examples 52-57 optionally include wherein the operations comprise: calculating a second measurement of the second code object; and extending the measurement with the second measurement.

In Example 59, the subject matter of any one or more of Examples 52-58 optionally include wherein the operations of calculating the measurement of the code object comprises the operations of calculating a secure hash of the code object.

In Example 60, the subject matter of any one or more of Examples 52-59 optionally include wherein the operations comprise: setting an indicator to indicate when the measurement of the code object has been completed and the measurement is present in a location accessible to the second device.

Example 61 is a peripheral device for providing secure measurements, the device comprising: means for calculating a measurement of a code object of a PCIe device; and means for making the measurement available to a second device over a Peripheral Interconnect Express (PCIe) interconnect.

In Example 62, the subject matter of Example 61 optionally includes wherein the code object is a firmware object.

In Example 63, the subject matter of any one or more of Examples 61-62 optionally include wherein the peripheral device is a network interface card.

In Example 64, the subject matter of any one or more of Examples 61-63 optionally include wherein the means for making the measurement available to the second device over the PCIe interconnect comprises means for utilizing a PCIe extended capability structure.

In Example 65, the subject matter of any one or more of Examples 61-64 optionally include means for storing the measurement in the hardware register.

In Example 66, the subject matter of Example 65 optionally includes means for calculating a second measurement of a second code object; means for storing the second measurement in a second hardware register; and means for making the contents of the second register available to the second device over the PCIe interconnect.

In Example 67, the subject matter of any one or more of Examples 61-66 optionally include wherein the method comprises: means for calculating a second measurement of the second code object; and means for extending the measurement with the second measurement.

In Example 68, the subject matter of any one or more of Examples 61-67 optionally include wherein the means for calculating the measurement of the code object comprises means for calculating a secure hash of the code object.

In Example 69, the subject matter of any one or more of Examples 61-68 optionally include wherein the method comprises: setting an indicator to indicate when the measurement of the code object has been completed and the measurement is present in a location accessible to the second device.

Example 70 is a method performed by a Peripheral Interconnect Express (PCIe) endpoint device comprising: calculating a measurement of a firmware object of the PCIe endpoint device; storing the measurement in a hardware register; and exposing the hardware register to a host device over a PCIe interconnect using a PCIe extended capability data structure.

In Example 71, the subject matter of Example 70 optionally includes calculating a second measurement of a second firmware object; storing the second measurement in a second hardware register; and exposing the second hardware register to a second device over a PCIe interconnect using a PCIe extended capability data structure.

In Example 72, the subject matter of any one or more of Examples 70-71 optionally include wherein the measurement comprises a cryptographic measurement.

In Example 73, the subject matter of Example 72 optionally includes wherein the measurement comprises a secure hash algorithm.

In Example 74, the subject matter of any one or more of Examples 70-73 optionally include calculating a second measurement of a second firmware object; and storing the second measurement in the hardware register via application of a secure hash algorithm to a value calculated by a logical concatenation of the value stored in the hardware register and the second measurement.

In Example 75, the subject matter of any one or more of Examples 70-74 optionally include setting a value of the hardware register to zero upon a reset of the PCIe endpoint device.

In Example 76, the subject matter of any one or more of Examples 70-75 optionally include wherein the PCIe endpoint device further comprises a network interface for a computer network.

In Example 77, the subject matter of any one or more of Examples 70-76 optionally include wherein the PCIe endpoint device further comprises a Graphics Processing Unit (GPU).

In Example 78, the subject matter of any one or more of Examples 70-77 optionally include wherein the PCIe extended capability data structure includes a capability header and a capability structure.

In Example 79, the subject matter of any one or more of Examples 70-78 optionally include wherein the PCIe extended capability data structure includes a digest valid flag, and wherein the method comprises setting the digest valid flag after the measurement is stored in the hardware register.

In Example 80, the subject matter of Example 79 optionally includes wherein the method comprises clearing the digest valid flag at a reset of the PCIe endpoint device.

Example 81 is at least one machine-readable medium, performed by a Peripheral Interconnect Express (PCIe) endpoint device, the at least one machine-readable medium comprising instructions, which when performed by the PCIe endpoint device, cause the PCIe endpoint device to perform the operations comprising: calculating a measurement of a firmware object of the PCIe endpoint device; storing the measurement in a hardware register; and exposing the hardware register to a host device over a PCIe interconnect using a PCIe extended capability data structure.

In Example 82, the subject matter of Example 81 optionally includes wherein the operations comprise: calculating a second measurement of a second firmware object; storing the second measurement in a second hardware register; and exposing the second hardware register to a second device over a PCIe interconnect using a PCIe extended capability data structure.

In Example 83, the subject matter of any one or more of Examples 81-82 optionally include wherein the measurement comprises a cryptographic measurement.

In Example 84, the subject matter of Example 83 optionally includes wherein the measurement comprises a secure hash algorithm.

In Example 85, the subject matter of any one or more of Examples 81-84 optionally include wherein the operations comprise: calculating a second measurement of a second firmware object; and storing the second measurement in the hardware register via application of a secure hash algorithm to a value calculated by a logical concatenation of the value stored in the hardware register and the second measurement.

In Example 86, the subject matter of any one or more of Examples 81-85 optionally include wherein the operations comprise setting a value of the hardware register to zero upon a reset of the PCIe endpoint device.

In Example 87, the subject matter of any one or more of Examples 81-86 optionally include wherein the PCIe endpoint device further comprises a network interface for a computer network.

In Example 88, the subject matter of any one or more of Examples 81-87 optionally include wherein the PCIe endpoint device further comprises a Graphics Processing Unit (GPU).

In Example 89, the subject matter of any one or more of Examples 81-88 optionally include wherein the PCIe extended capability data structure includes a capability header and a capability structure.

In Example 90, the subject matter of any one or more of Examples 81-89 optionally include wherein the PCIe extended capability data structure includes a digest valid flag, and wherein the operations comprise setting the digest valid flag after the measurement is stored in the hardware register.

In Example 91, the subject matter of Example 90 optionally includes wherein the operations comprise clearing the digest valid flag at a reset of the PCIe endpoint device.

Example 92 is a Peripheral Interconnect Express (PCIe) endpoint device comprising: means for calculating a measurement of a firmware object of the PCIe endpoint device; means for storing the measurement in a hardware register; and means for exposing the hardware register to a host device over a PCIe interconnect using a PCIe extended capability data structure.

In Example 93, the subject matter of Example 92 optionally includes means for calculating a second measurement of a second firmware object; means for storing the second measurement in a second hardware register; and means for exposing the second hardware register to a second device over a PCIe interconnect using a PCIe extended capability data structure.

In Example 94, the subject matter of any one or more of Examples 92-93 optionally include wherein the measurement comprises a cryptographic measurement.

In Example 95, the subject matter of Example 94 optionally includes wherein the measurement comprises a secure hash algorithm.

In Example 96, the subject matter of any one or more of Examples 92-95 optionally include means for calculating a second measurement of a second firmware object; and means for storing the second measurement in the hardware register via application of a secure hash algorithm to a value calculated by a logical concatenation of the value stored in the hardware register and the second measurement.

In Example 97, the subject matter of any one or more of Examples 92-96 optionally include means for setting a value of the hardware register to zero upon a reset of the PCIe endpoint device.

In Example 98, the subject matter of any one or more of Examples 92-97 optionally include wherein the PCIe endpoint device further comprises a network interface for a computer network.

In Example 99, the subject matter of any one or more of Examples 92-98 optionally include wherein the PCIe endpoint device further comprises a Graphics Processing Unit (GPU).

In Example 100, the subject matter of any one or more of Examples 92-99 optionally include wherein the PCIe extended capability data structure includes a capability header and a capability structure.

In Example 101, the subject matter of any one or more of Examples 92-100 optionally include wherein the PCIe extended capability data structure includes a digest valid flag, and wherein the device comprises means for setting the digest valid flag after the measurement is stored in the hardware register.

In Example 102, the subject matter of Example 101 optionally includes means for clearing the digest valid flag at a reset of the PCIe endpoint device.

What is claimed is:

1. A method of providing a firmware measurement of a function of an endpoint device across a Peripheral Component Interconnect Express (PCIe) interconnect, the method comprising:
    calculating a measurement of a firmware object of the function, wherein the function is an endpoint for a PCIe communication and the measurement is a cryptographic identifier of the firmware object;
    storing the calculated measurement in a first register;
    calculating a second measurement of another firmware object of the endpoint device;

storing the second measurement in a second register; and
exposing the measurements of the firmware objects of the endpoint device as a PCIe capability structure.

2. The method of claim 1, including:
updating the first register with the second measurement; and
exposing the first register to the other device using the PCIe capability structure.

3. The method of claim 1, including:
updating the first register with an extended measurement determined by a hash algorithm using the calculated measurement of the firmware object and the second calculated measurement of the other firmware object; and
exposing the extended measurement to the other device using the PCIe capability structure.

4. The method of claim 1, including:
providing information that a measurement has changed in the PCIe capability structure.

5. The method of claim 1, including providing PCIe capability version information in the PCIe capability structure.

6. The method of claim 1, including providing measurement length information in the PCIe capability structure.

7. The method of claim 1, wherein calculating the measurement of a firmware object of the function includes calculating the measurement in association with a boot operation.

8. A Peripheral Component Interconnect Express (PCIe) device comprising:
a PCIe interface;
a function including a firmware object, wherein the function is an endpoint for a PCIe communication;
a first register;
a second register; and
a processor configured to:
calculate a measurement of the firmware object of the function, wherein the measurement is a cryptographic identifier of the firmware object;
store the calculated measurement in the first register;
calculate a second measurement of another firmware object of the PCIe device and store the second measurement in the second register; and
expose the measurements of the firmware objects to another device as a PCIe capability structure via the PCIe interface.

9. The PCIe device of claim 8, including:
a PCIe controller configured to execute the firmware object of the function; and
an out of band controller configured to execute the other firmware object.

10. The PCIe device of claim 8,
wherein the processor is configured to:
update the first register with the second measurement; and
expose the first register to the other device using the PCIe capability structure.

11. The PCIe device of claim 8,
wherein the processor is configured to:
update the first register with an extended measurement determined by a hash algorithm using the calculated measurement of the firmware object and the second calculated measurement of the other firmware object; and
expose the extended measurement to the other device using the PCIe capability structure.

12. The PCIe device of claim 8, wherein the processor is configured to include an indication in the PCIe capability structure that the measurement is a hash extend measurement.

13. The PCIe device of claim 8, wherein the processor is configured to calculate the measurement of the firmware object of the function in association with a boot operation of the device.

14. A computing system, the system comprising:
a host device;
a Peripheral Component Interconnect Express (PCIe) link connected to the host device; and
a peripheral device connected to the PCIe link, wherein the peripheral device includes:
a first register;
a second register; and
a processor, wherein the processor of the peripheral device is configured to:
calculate a measurement of the firmware object of the function, wherein the measurement is a cryptographic identifier of the firmware object;
store the calculated measurement in the first register;
calculate a second measurement of another firmware object of the endpoint device and store the second measurement in the second register; and
include the measurements of the firmware objects in a PCIe capability structure exposed to the host device via the PCIe link.

15. The system of claim 14,
wherein the processor of the peripheral device is configured to:
update the first register with the second measurement; and
include contents of the first register in the PCIe capability structure exposed to the host device via the PCIe link.

16. The system of claim 14,
wherein the processor of the peripheral device is configured to:
update contents of the first register with an extended measurement determined by a hash algorithm using the calculated measurement of the firmware object and the second calculated measurement of the other firmware object; and
include the extended measurement in the PCIe capability structure exposed to the host device via the PCIe link.

17. The system of claim 14, including:
a Trusted Protection Module (TPM) component connected to the PCIe link; and
wherein the host device is configured to store the measurement in the TPM component.

* * * * *